United States Patent
Celi, Jr. et al.

(10) Patent No.: US 7,406,168 B2
(45) Date of Patent: Jul. 29, 2008

(54) CONNECTION MANAGER FOR INTEGRATING LEGACY TELEPHONY ENVIRONMENTS AND IP NETWORKS

(75) Inventors: Joseph Celi, Jr., Boca Raton, FL (US); Brett J. Gavagni, Sunrise, FL (US); Victor S. Moore, Boynton Beach, FL (US); Margarita Zabolotskaya, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 794 days.

(21) Appl. No.: 10/324,536

(22) Filed: Dec. 19, 2002

(65) Prior Publication Data

US 2004/0120501 A1 Jun. 24, 2004

(51) Int. Cl.
*H04M 3/00* (2006.01)
*H04M 5/00* (2006.01)
*H04M 7/00* (2006.01)

(52) U.S. Cl. .................... 379/265.01; 379/221.01
(58) Field of Classification Search ........... 379/265.01, 379/220.01, 221.01, 221.06
See application file for complete search history.

(56) References Cited

U.S. PATENT DOCUMENTS

| | | | |
|---|---|---|---|
| 5,594,784 A | 1/1997 | Velius | 379/88 |
| 5,999,611 A | 12/1999 | Tatchell et al. | 379/211 |
| 6,044,133 A | 3/2000 | Furukawa et al. | 379/88.01 |
| 6,154,644 A | 11/2000 | Murray | 455/414 |
| 6,163,535 A | 12/2000 | Jordan et al. | 370/352 |
| 6,208,970 B1 | 3/2001 | Ramanan | 704/270 |
| 6,292,478 B1* | 9/2001 | Farris | 370/352 |
| 6,295,292 B1* | 9/2001 | Voit et al. | 370/352 |
| 6,363,411 B1* | 3/2002 | Dugan et al. | 709/202 |
| 6,577,638 B1* | 6/2003 | Tashiro et al. | 370/401 |
| 6,741,695 B1* | 5/2004 | McConnell et al. | 379/229 |
| 6,779,030 B1* | 8/2004 | Dugan et al. | 709/223 |
| 6,944,150 B1* | 9/2005 | McConnell et al. | 370/352 |
| 6,956,843 B1* | 10/2005 | Breivik et al. | 370/352 |
| 2002/0122547 A1* | 9/2002 | Hinchey et al. | 379/221.01 |
| 2002/0141358 A1* | 10/2002 | Requena | 370/329 |
| 2002/0181398 A1* | 12/2002 | Szlam | 370/230 |
| 2005/0021713 A1* | 1/2005 | Dugan et al. | 709/223 |
| 2005/0232222 A1* | 10/2005 | McConnell et al. | 370/349 |

OTHER PUBLICATIONS

U.S. Appl. No. 10/310,238, filed Dec. 4, 2002, Celi et al.

* cited by examiner

*Primary Examiner*—Quynh H Nguyen
(74) *Attorney, Agent, or Firm*—Akerman Senterfitt

(57) ABSTRACT

In a telephony call management system, a method of distributing calls among a plurality of packet-based load balancing resources can include receiving over a telephony channel a call request specifying call information, comparing the call information with selection criteria to select one of the plurality of packet-based load balancing resources, and querying the selected packet-based load balancing resource to resolve the call request. A response from the selected packet-based load balancing resource can be received which indicates whether the call request can be resolved.

6 Claims, 3 Drawing Sheets

CONNECTION MANAGER FOR INTEGRATING LEGACY TELEPHONY ENVIRONMENTS AND IP NETWORKS

BACKGROUND OF THE INVENTION

1. Technical Field

The invention relates to the field of telephony, and, more particularly, to utilizing load balancing resources within a telephony environment.

2. Description of the Related Art

Presently, when implementing a telephony environment, a system developer must select a particular telephony communications environment. Once selected, the system developer is constrained to work within that telephony environment. That is, a system developer choosing to build a Session Initiation Protocol (SIP) based telephony solution implements the entire design within the context of SIP. Similarly, a telephony solution which relies upon H.323 will be implemented within the context of H.323. The system designer can select the telephony environment which best suits the overall needs of an organization.

Still, constraining a telephony solution to a single communications environment can have unavoidable consequences. As is often the case, although the selected telephony environment provides significant benefits with respect to the overall needs of the organization, inevitably, the selected telephony environment also will have deficiencies with respect to smaller, more specific organizational needs or implementation details.

For example, while the telephony environment can provide for most needs of the organization, the system designer must select only those components which are compatible with the selected telephony environment and protocol. In consequence, the system designer often cannot select "best of breed" components when constructing the telephony system. In other words, particular components which may be preferred by the system designer may not be available or compatible with the telephony environment selected for the organization. Accordingly, the system designer can be forced to sacrifice preferred components in favor of designing an overall system which generally accommodates most needs of the organization. In other cases, to incorporate a preferred component within a system design, the system designer may be forced to implement a custom programmed interface. This can add significant time and expense when implementing the telephony system.

SUMMARY OF THE INVENTION

The present invention provides a method, system, and apparatus for providing scalable load distribution and presence detection which can support both legacy telephony and Internet Protocol (IP) telephony environments. More particularly, the present invention provides a solution for utilizing legacy telephony connections and IP telephony environments within a single telephony solution or system. Accordingly, any of a variety of different load balancing resources can be incorporated into a single telephony system thereby facilitating the handling of calls originating from the public switched telephone network (PSTN) and other packet-based telephony networks by a selected load balancing resource.

One aspect of the present invention can include a method of distributing calls among multiple packet-based load balancing resources in a telephony call management system. The method can include receiving over a telephony channel a call request specifying call information and comparing the call information with selection criteria to select one of the packet-based load balancing resources. The call request can be received from a circuit-switched or packet-switched telephony network. The selected packet-based load balancing resource can be queried to resolve the call request.

A response can be received from the selected packet-based load balancing resource indicating whether the call request can be resolved. If the call request was not resolved, the method can include selecting and querying subsequent ones of the packet-based load balancing resources until no further load balancing resources are left to be queried or until the call request is resolved.

In another embodiment of the present invention, the call information can specify origination information. Accordingly, the comparing step can include identifying origination information for the call request, comparing the origination information with the selection criteria, and selecting a packet-based load balancing resource which is associated with the origination information.

If the call information specifies termination information, the comparing step can include identifying the termination information for the call request, comparing the termination information with the selection criteria, and selecting a packet-based load balancing resource which is associated with the termination information.

The call information also can specify a telephony communications protocol and/or a telephony channel for the call request. The comparing step can include identifying the telephony communications protocol and/or the telephony channel for the call request and comparing the telephony communications protocol and/or the telephony channel with the selection criteria. A packet-based load balancing resource can be selected according to the telephony communications protocol and/or the telephony channel of the call request.

Another aspect of the present invention can include a call management system having one or more telephony channel interfaces, each configured to communicate with a particular telephony communications channel and one or more load balancing resource interfaces, each configured to communicate with a packet-based load balancing resource. The call management system can include a processor configured to receive call requests via the telephony channel interfaces and query load balancing resources via the load balancing resource interfaces to determine a resolution for the call request.

The processor also can include a registry specifying available packet-based load balancing resources available for resolving call requests and selection criteria specifying a hierarchy for querying the packet-based load balancing resources according to call information specified by the call requests. The telephony channel interfaces can include one or more circuit-switched telephony channel interfaces configured to communicate over circuit-switched telephony channels and one or more packet-switched telephony interfaces configured to communicate with packet-switched telephony channels. The packet-switched telephony channel interfaces can include a first packet-switched telephony channel interface configured to communicate with a first packet-switched telephony channel using a first communications protocol and a second packet-switched telephony channel interface configured to communicate with a second packet-switched telephony channel using a second communications protocol.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

The present invention provides a method, system, and apparatus for providing scalable load distribution and presence detection which can support both legacy telephony and Internet Protocol (IP) telephony environments. More particularly, the present invention can integrate legacy telephony connections and IP telephony environments within a single telephony system. By incorporating one or more load balancing resources within an integrated telephony system, the present invention facilitates the handling of calls originating from the public switched telephone network (PSTN) and other packet-based telephony networks. Accordingly, calls can be directed to particular ones of the available load balancing resources.

Figure 1:
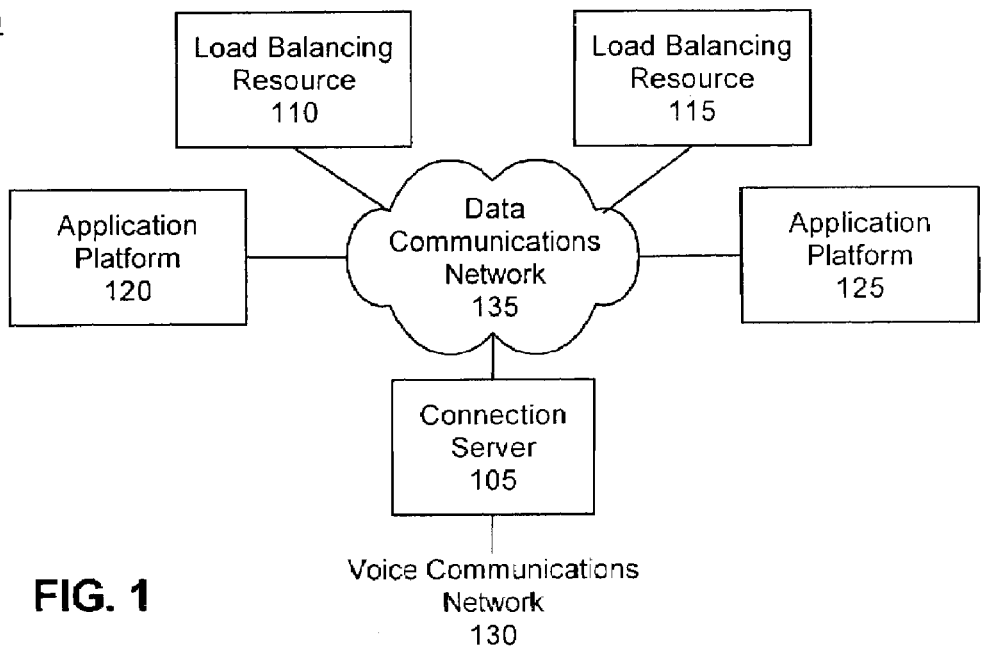
FIG. 1 is a schematic diagram illustrating an exemplary telephony environment configured in accordance with the present invention.

FIG. 1 is a schematic diagram illustrating an exemplary telephony environment 100 configured in accordance with the present invention. The telephony environment 100 can include a connection server 105, one or more load balancing resources 110 and 115, as well as one or more telephony resources 120 and 125. The connection server 105 facilitates communications with the voice communications network 130. The voice communications network 130 can include the PSTN, private circuit-switched telephony networks, public packet-switched telephony networks, and private packet-switched telephony networks. For example, as used herein, the voice communications network 130 can include, but is not limited to, a Session Initiation Protocol (SIP) telephony environment, an H.323 telephony environment, as well as other computer-telephony integration (CTI) environments.

Accordingly, the connection server 105 can function as an interface to the various telephony networks described herein. For example, the connection server 105 can be implemented as a server or as one or more distributed servers, having appropriate telephony interfaces, for example line cards for communicating with circuit-switched and packet-switched voice communications networks. Notably, the connection server 105 can include interfaces to various telephony signaling networks in connection with the PSTN. For example, the connections server 105 can include a Signaling System 7 (SS7) network interface.

The connection server 105 can communicate with the load balancing resources 110 and 115 and the telephony resources 120 and 125 via the data communications network 135. The data communications network can support various packet-based telephony communications protocols as described herein. The load balancing resources 110 and 115 can include, but are not limited to, a SIP proxy, a SIP redirect server, and/or and an H.323 gatekeeper. The load balancing resources can include, however, additional CTI load balancing resources such as programs or processing nodes which can resolve telephone calls within a packet-switched communications network. More particularly, the load balancing resources can provide scalable load distribution and presence detection within a telephony network.

The telephony resources 120 and 125 can include any of a variety of voice processing and/or call processing applications, processing nodes, or execution environments (platforms). Examples of telephony resources can include a JAVA execution environment for JAVA Beans configured to provide voice and/or call processing services or other software platforms capable of providing interactive voice response services, call redirection, and the like. The aforementioned examples of application platforms are provided for purposes of illustration only. Accordingly, it should be appreciated that any of a variety of commercially available execution environments, standalone programs, or server system to which calls can be routed or terminated, or which can process received calls can serve as a telephony resource.

In operation, the connection server 105 can receive call requests via the voice communications network 130 over any of a variety of telephony channels, whether originating from a circuit-switched telephony network or a packet-switched telephony network. The connection server 105 can query one of the load balancing resources 110 or 115 to determine whether either one or both can provide a resolution for a received call request. Based upon the response received from the first load balancing resource to be queried, the connection server 105 can either terminate involvement with the call, in the case where the call termination point is resolved, or continue querying other load balancing resources in the case of a negative response received from the first load balancing resource.

Figure 2:
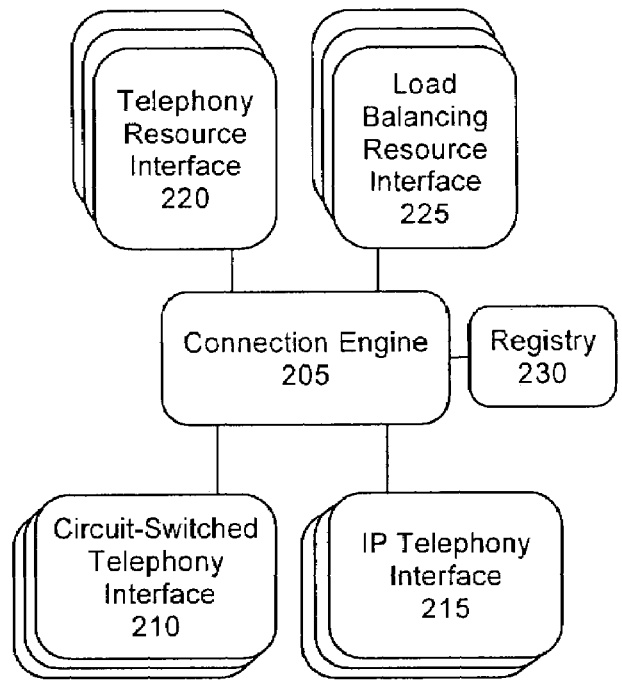
FIG. 2 is a schematic diagram illustrating a connection manager in accordance with the present invention.

FIG. 2 is a schematic diagram illustrating a connection manager 200 in accordance with the present invention. The connection manager 200 can execute within the connection server described with reference to FIG. 1. Accordingly, the connection manager 200 can receive calls and telephony signaling data associated with received call requests over multiple telephony channels. As shown, the connection manager 200 can include a connection engine 205, one or more circuit-switched telephony interfaces 210, one or more IP telephony interfaces 215, as well as one or more load balancing resource interfaces 225. The connection manager further can include one or more telephony resource interfaces 220, and a registry 230.

The circuit-switched telephony interface 210 can be configured to communicate with any of a variety of proprietary hardware interfaces which connect with the PSTN or private circuit-switched telephony network equipment. For example, the circuit-switched telephony interface 210 can communicate with a line card or other hardware component which can be included within the connection server to facilitate communications with the PSTN or other telephony network. Notably, the circuit-switched telephony interface 210 can be configured to communicate with a particular manufacturer's interface hardware. Accordingly, the circuit-switched telephony interface 210 can receive call requests and telephony signaling data from a matched hardware interface and convert the received data from a manufacturer specific protocol or format into an internal format. From the internal format utilized by the connection manager 200, data can be readily converted or translated into another communications protocol used by one of the load balancing resources. For example, data can be extracted or parsed from call request information such that unnecessary protocol specific overhead is not retained. It should be appreciated that the circuit-switched telephony interface 210 can support two-way communications with a matched hardware interface.

As shown, more than one circuit-switched telephony interface 210 can be incorporated into the connection manager 200. For example, in the case where the connection manager 200 includes more than one such interface, each of the circuit-switched telephony interfaces 210 can be configured to communicate with a particular manufacturer's hardware interface and proprietary data exchange format.

The IP telephony interfaces 215 can support two-way communications over designated packet-switched telephony channels. More particularly, the IP telephony interfaces 215 can support two-way communications with hardware interfaces for various packet-based telephony networks and translate telephony information, whether voice and/or signaling information, from a receiving protocol to the internal format used by the connection manager 200. One IP telephony interface 215 can be included for each packet-based telephony protocol, or each hardware interface to a packet-based telephony network, with which the connection manager 200 is to communicate.

The load balancing resource interface 225 can facilitate two-way communications with a load balancing resource and the connection manager 200. The load balancing resource interface 225 can translate queries as well as any other telephony data, including both voice data and signaling data, from the internal format of the connection manager 200 to the communications protocol used by the load balancing resource with which the load balancing resource interface 225 is to communicate. Similar to the IP telephony interface 215, one load balancing resource interface 225 can be provided for each load balancing resource which utilizes a different communications protocol.

The telephony resource interface 220 can transfer information between the connection manager 200 and various telephony resources. Notably, in the event that the telephony resources register with the load balancing resources and the connection manager 200 does not track or monitor activities of the telephony resources, no telephony resource interface 220 need be included. In any event, if an application platform is to communicate with the connection manager 200, a telephony resource interface 220 can be provided for each telephony resource.

The connection engine 205 can receive telephony data from the PSTN interfaces 210 and the IP telephony interfaces 215. The connection engine 205 can analyze the received telephony data with respect to the origination point as specified by a calling number or a network address and the destination point, also as specified by a calling number or a network address for a received call request. The connection engine 205 can consult the registry 230 to determine which available load balancing resource to query responsive to receiving a telephone call request. More particularly, the connection engine 205 can select a load balancing resource which has been registered with the connection manager 200 in the registry 230 according to one or more processing rules and/or selection criteria.

The connection engine 205 can communicate with the circuit-switched interfaces 210 and the IP telephony interfaces 215 via a suitable inbound messaging mechanism (not shown). Similarly, the connection engine 205 can communicate with the telephony resource interfaces 220 and the load balancing resource interfaces 225 via a messaging mechanism. For example, communications between the various components of the connection manager can be supported via inbound and outbound event buses, message queues, or other suitable message routing mechanisms.

Figure 3:
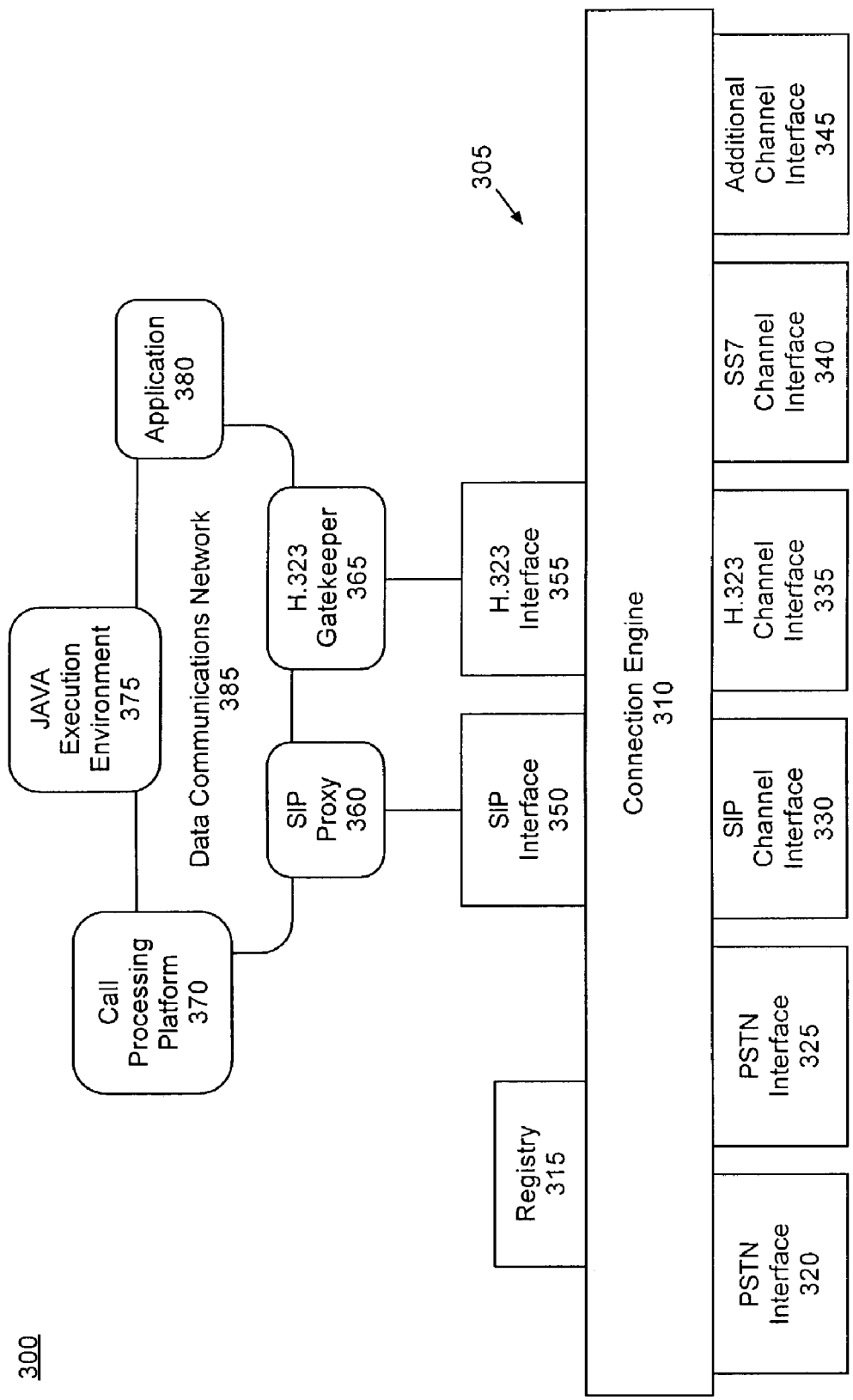
FIG. 3 is a schematic diagram illustrating additional aspects of the connection manager of FIG. 2.

FIG. 3 is a schematic diagram illustrating a telephony environment 300 having an exemplary connection manager 305 operating therein and configured in accordance with the present invention. The connection manager 305, as shown, can include a connection engine 310 and a registry 315. The connection manager 305 can include a variety of interfaces for communicating via different telephony channels. As shown, the connection manager can include two PSTN interfaces 320 and 325 for communicating with different manufacturer specific hardware interfaces to the PSTN. As noted, the manufacturer specific hardware interfaces can be line cards and/or other gateways to the PSTN which utilize proprietary communications formats.

The connection manager 305 can include a SIP channel interface 330 and an H.323 channel interface 335 for communicating with SIP and H.323 communications channels respectively. An SS7 channel interface 340 as well as one or more additional channel interfaces 345 to other CTI communications channels can be included. The connection manager 305 further can include a SIP interface 350 for communicating with a SIP proxy 360 and an H.323 interface 355 for communicating with an H.323 gatekeeper 365.

The SIP proxy 360 and the H.323 gatekeeper 365, referred to as load balancing resources, provide load balancing, scaling, resource detection, and management functionality. The call processing resources can include, but are not limited to, a call processing platform 370, a JAVA execution environment 375 for call processing, as well as one or more applications 380 which can provide various other telephony services. The load balancing resources and the call processing resources can communicate with one another, as well as with the connection manager 310, via the data communications network 385.

In operation, the call processing platform 370, the JAVA execution environment 375, an any other applications 380 can register with a designated one of the load balancing resources. More particularly, the call processing platform 370 can register with the SIP proxy 360, for example, while the JAVA execution environment 375 can register with the H.323 gatekeeper. Each of the call processing resources can register with a particular load balancing resource which can be determined during configuration of the telephony environment 300.

The connection manager, although not shown with reference to FIG. 3, can include interfaces to each of the telephony resources. Accordingly, the telephony resources can be registered with the connection manager 305 within the registry 315.

In such a configuration, the connection manager 305 can remain within the data path of a resolved call and/or route calls to the telephony resources as indicated by one of the load balancing resources.

Accordingly, a call request received via one of the telephony channel interfaces can be provided to the connection engine 310. The connection engine 310 can determine telephony information for the received call request such as the specified origination point, the termination point, as well as the particular telephony channel and/or protocol over which the call request was received. The registry 315 of the connection manager 305 can specify a listing of available load balancing resources. In this case, the registry 315 can specify that the SIP proxy 360 and the H.323 gatekeeper 365 are available.

The connection engine 310 can apply various selection criteria to the received call request to select a load balancing resource to query in order to properly resolve the received call request. Thus, depending upon the particular selection criteria employed, the connection manager 305 can query the SIP proxy 360 or the H.323 gatekeeper 365. Notably, if one load balancing resource does not provide a resolution for a call, the other load balancing resource can be queried.

Figure 4:
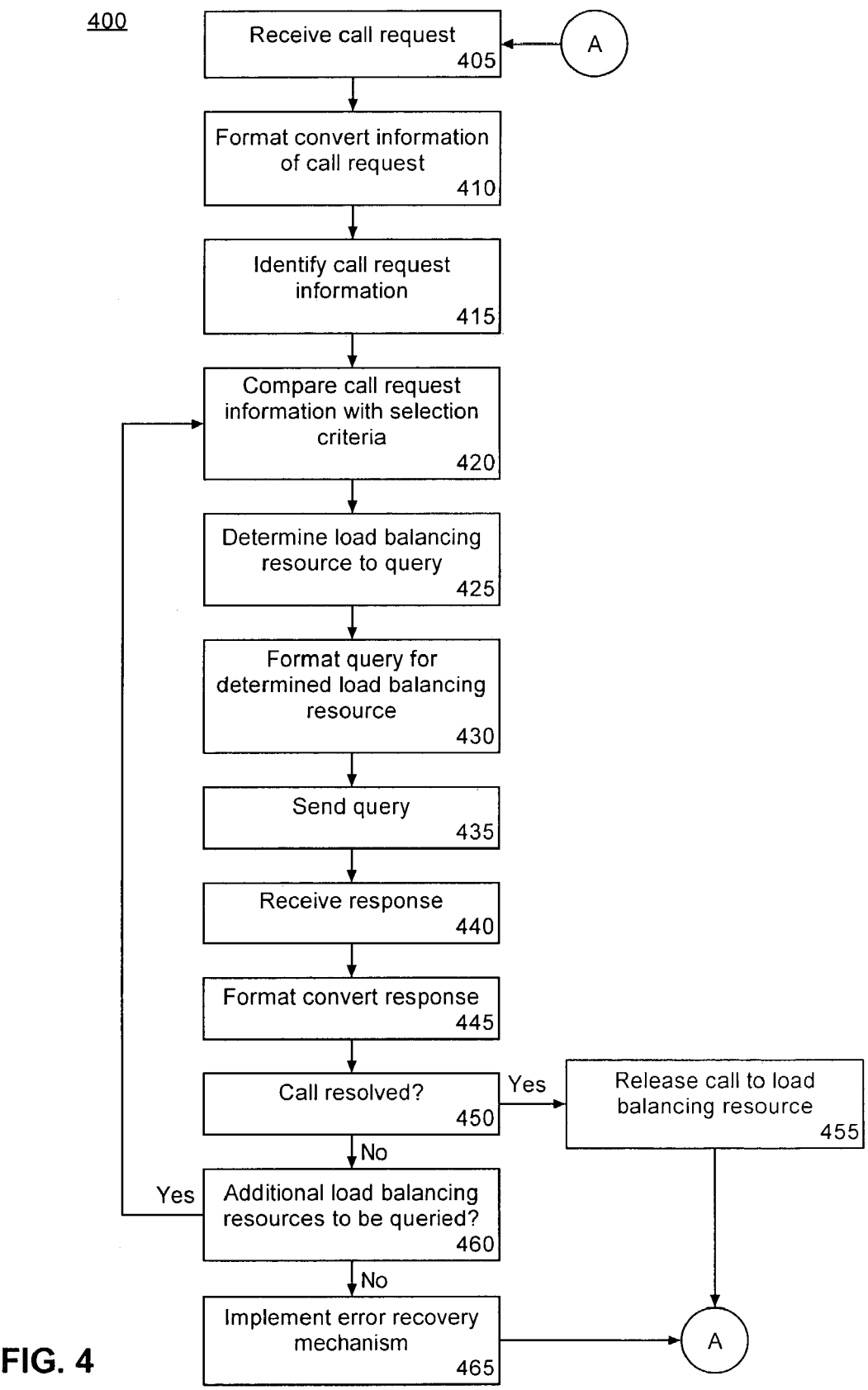
FIG. 4 is a flow chart illustrating a method of call processing and load balancing according to the present invention.

FIG. 4 is a flow chart illustrating a method 400 of call processing and load balancing according to the present invention. The method 400 can begin in step 405 where a call request can be received. That is, one of the telephony channel interfaces can receive telephony signaling information indicating that a call request has been received. In step 410, the telephony channel interface which received the call request can format convert the received telephony information into the internal format used by the connection manager. The telephony information, having been format converted, can be passed to the connection engine for processing.

In step 415, the connection engine can identify various parameters from the telephony information associated with the call request. For example, the connection engine can identify originating node information such as a number or a network address. Similarly, the connection engine can identify termination point information such as a number or network address of a destination node specified within the call request. Other relevant call request information can include, but is not limited to, the time a call request is made or received, priority data, as well as the particular telephony channel and communications protocol over which the call request was received.

In step 420, the connection engine can compare the identified call information with selection criteria. The selection criteria can specify an order in which the various load balancing resources which are registered with the connection manager are to be queried to resolve the received call request. For example, the selection criteria can specify that the SIP proxy is to be queried prior to the H.323 gateway for call requests received over a particular telephony channel. Alternatively, the selection criteria can predicate the query hierarchy upon particular numbers or exchanges, a domain of a network address, a user name of a network address, whether for the originating point and/or the terminating point, or other information specified within the call request. Still, the selection criteria can employ combinations of the call request parameters disclosed herein.

In step 425, by comparing the identified call request information with the selection criteria, the connection engine can determine a load balancing resource to be queried. In step 430, the connection engine can generate a query which can be sent to the load balancing resource interface associated with the determined load balancing resource. For example, if the determined load balancing resource was the H.323 gatekeeper, a query can be sent to the H.323 interface, which can translate the query from the internal messaging format of the connection manager to a query which complies with the H.323 protocol.

In step 435, the query can be sent to the load balancing resource. The load balancing resource can begin to determine whether the call request can be resolved within that network. For example, the load balancing resource can begin searching and querying other network resources to determine whether the termination point is specified or available within that network. Thus, for instance, if the SIP proxy received the query, the SIP proxy can determine whether the received call request can be resolved. In illustration, if the received call request specifies a termination point corresponding to an application executing within an interactive voice response system that is registered with the SIP proxy, the SIP proxy can resolve the received call request.

In step 440, a response from the queried load balancing resource can be received via the associated or matching load balancing interface. The response can be format converted to the internal messaging format or syntax of the connection manager in step 445 and forwarded to the connection engine.

The connection engine, in step 450 can determine whether the response indicates that the load balancing resource can resolve the call or that the load balancing resource cannot resolve the call. If the call request can be resolved by the load balancing resource, the method can proceed to step 455, where the connection manager can release the call. More particularly, the connection manager can terminate any involvement with the call and allow the load managing resource to continue with call setup functions. While the connection manager can remain in the signal path, that is routing data between network interfaces and load balancing resources, according to another embodiment, the connection manager can remove itself from the communication path such that the connection manager need not perform any data routing. The method can repeat as necessary to process further call requests.

If the call request was not resolved, the method can proceed to step 460. In step 460, a determination can be made as to whether additional load balancing resources remain to be queried. As noted, the registry of the connection manager can specify the available load balancing resources. In any case, if no further load balancing resources remain to be queried, the method can continue to step 465 where an error recovery procedure can be implemented. After implementing an error recovery mechanism such as dropping the call request or informing the call originator of the failure, the method can repeat as necessary to process additional call requests.

If, however, additional load balancing resources remain to be queried, the method can proceed to step 420 to determine a next load balancing resource to query based upon a comparison of the call request information with the selection criteria. Notably, the entire load balancing resource query hierarchy can be determined during the first pass through the method 400. In that case, the method can proceed to step 425 to select or determine the next load balancing resource to be queried.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. In a telephony call management system, a method of distributing calls among a plurality of packet-based load balancing resources comprising:

receiving over a telephony channel a call request specifying call information;

determining based upon the call information a set of parameters, the set of parameters comprising a call termination point, time that the call request is received, telephony channel over which the call request is received, a telephony communications protocol according to which the call request is received, and a priority parameter associated with the call request;

in a first format conversion, parsing said call information to remove unnecessary protocol-specific overhead and converting a format of said call information, the format based upon a resource-specific protocol, into an internal format;

detecting a presence of the plurality of packet-based load balancing resources by monitoring activities of the plurality of packet-based load balancing resources associated with the telephony communications protocol to detect an availability of at least one packet-based load balancing resource to resolve the call request in view of the presence and the telephony communications protocol;

registering the plurality of packet-based load balancing resources in order of the presence, wherein the presence determines whether said call information is converted from the internal format to another format in a secondary format conversion and prevents processing of the secondary format conversion for unavailable load balance resources;

comparing the call information with selection criteria to select one of a plurality of packet-based load balancing resources in the order of presence based upon at least one parameter contained in the set of parameters determined from the call information;

querying the selected packet-based load balancing resource in the order of presence to resolve the call request; and receiving a response from the selected packet-based load balancing resource indicating whether the call request can be resolved;

if the call request was not resolved, selecting and querying subsequent ones of the plurality of packet-based load balancing resources in the order of presence until no further load balancing resources are left to be queried or until the call request is resolved; and if the call request was resolved, in the second format conversion, converting said call information from the internal format into another format based upon a protocol utilized by the selected load balancing resource or a subsequently selected load balancing resource;

wherein the selection criteria specifies a priority order for call requests based on the telephony protocol.

2. The method of claim 1, wherein said receiving step receives the call request from a circuit-switched telephony network.

3. The method of claim 1, wherein said call information specifies origination information, said comparing step further comprising:

identifying the origination information for the call request;

comparing the origination information with the selection criteria; and selecting a packet-based load balancing resource which is associated with the origination information;

wherein the selection criteria specifies the order in which the plurality of packet-based load balancing resources are queried to resolve the call request, and the selection criteria predicates the order of query based upon at least one among a number or exchange, a domain of a network address, and a user name of a network address.

4. The method of claim 1, wherein said call information specifies termination information corresponding to the call termination point, said comparing step further comprising:

identifying the termination information for the call request;

comparing the termination information with the selection criteria; and selecting a packet-based load balancing resource which is associated with the termination information;

wherein the selection criteria specifies the order in which the plurality of packet-based load balancing resources are queried to resolve the call request, and the selection criteria predicates the order of query based upon at least one among a number or exchange, a domain of a network address, and a user name of a network address.

5. The method of claim 1, wherein said comparing step comprises:

comparing the telephony communications protocol with the selection criteria; and selecting a packet-based load balancing resource according to the telephony communications protocol of the call request.

6. The method of claim 1, wherein said comparing step comprises:

identifying the telephony channel for the call request;

comparing the telephony channel with the selection criteria; and selecting a packet-based load balancing resource according to the telephony channel of the call request.

* * * * *